US008827275B2

(12) United States Patent
Heinrich et al.

(10) Patent No.: US 8,827,275 B2
(45) Date of Patent: Sep. 9, 2014

(54) SEALING DEVICE FOR ROTARY FEEDTHROUGH

(75) Inventors: Hans-Juergen Heinrich, Grossroehrsdorf (DE); Ulf Seyfert, Dresden (DE); Peter Botzler, Langebrueck (DE)

(73) Assignee: Von Ardenne Anlagentechnik GmbH, Dresden (DE)

( * ) Notice: Subject to any disclaimer, the term of this patent is extended or adjusted under 35 U.S.C. 154(b) by 2 days.

(21) Appl. No.: 13/561,875

(22) Filed: Jul. 30, 2012

(65) Prior Publication Data

US 2012/0299247 A1 Nov. 29, 2012

Related U.S. Application Data

(63) Continuation of application No. 12/643,457, filed on Dec. 21, 2009.

(30) Foreign Application Priority Data

Dec. 22, 2008 (DE) .......................... 10 2008 064 181
Mar. 25, 2009 (DE) .......................... 10 2009 014 214

(51) Int. Cl.
*F16J 15/02* (2006.01)
*F16J 15/46* (2006.01)
*F16J 15/00* (2006.01)
*F16J 15/32* (2006.01)

(52) U.S. Cl.
CPC ................ *F16J 15/004* (2013.01); *F16J 15/46* (2013.01); *F16J 15/006* (2013.01); *F16J 15/3208* (2013.01); *F16J 15/3228* (2013.01); *F16J 15/002* (2013.01)
USPC ......................................... 277/353; 277/558

(58) Field of Classification Search
CPC ....... F16J 15/002; F16J 15/185; F16J 15/186; F16J 15/3208
USPC ............. 118/50, DIG. 11; 277/345, 353, 549, 277/551, 558, 913
See application file for complete search history.

(56) References Cited

U.S. PATENT DOCUMENTS 4,109,922 A * 8/1978 Martin .......................... 277/646
4,534,569 A 8/1985 Ishitani et al.
(Continued)

FOREIGN PATENT DOCUMENTS

DE 2702809 A1 8/1977
DE 2811196 A1 9/1979
(Continued)

OTHER PUBLICATIONS

Examination Report dated Jul. 29, 2013 for corresponding German application No. 10 2009 014 214.2.

*Primary Examiner* — Vishal Patel
(74) *Attorney, Agent, or Firm* — Heslin Rothenberg Farley & Mesiti P.C.

(57) ABSTRACT

A sealing device for a rotary feedthrough for receiving a rotating machine element whose outer side can be applied to another machine element, includes at least two sealing elements disposed in tandem in the axial direction of the machine element. Inner sides of the sealing elements are configured for forming an active sealing connection with the rotating machine element. At least one of the sealing elements can be pressurized with an additional force acting in the radial direction so that the force of compression acting on the rotating machine element for the at least one of the sealing elements can be adjusted relative to the force of compression acting on the rotating machine element due to at least one other sealing element.

2 Claims, 6 Drawing Sheets

(56) References Cited

U.S. PATENT DOCUMENTS

Figure 1:
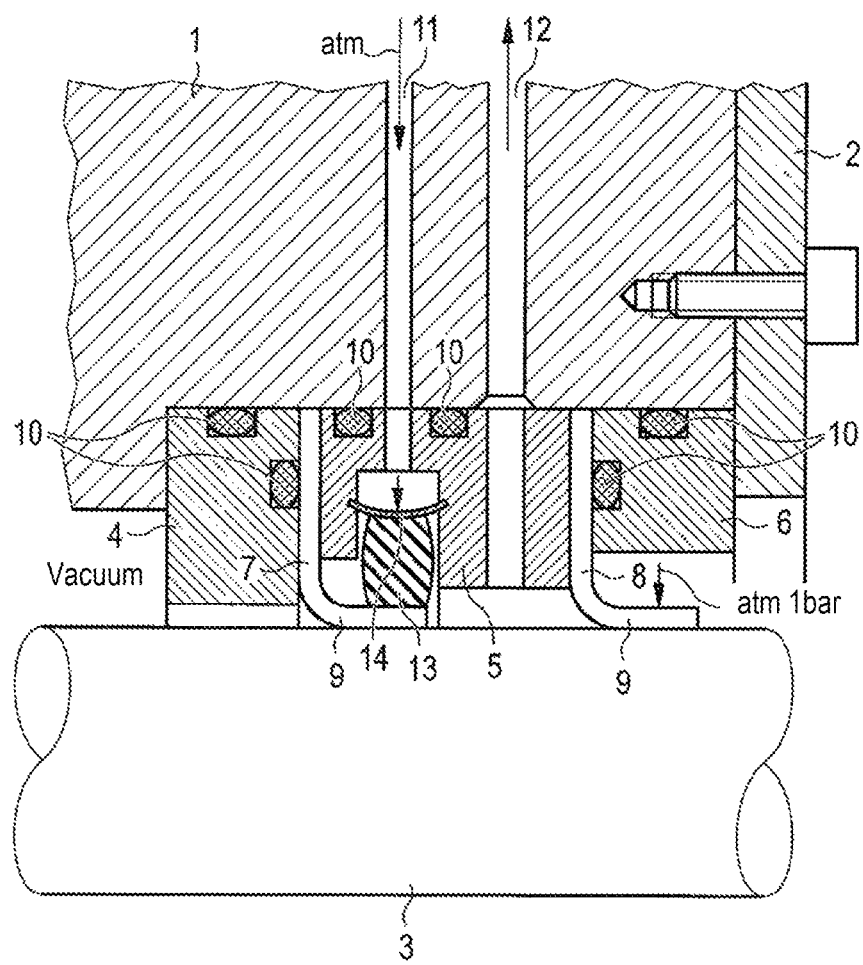

| | | |
|---|---|---|
| 4,741,561 A | 5/1988 | Morita et al. |
| 5,137,116 A | 8/1992 | Von Bergen et al. |
| 5,180,008 A | 1/1993 | Aldridge et al. |
| 5,219,434 A | 6/1993 | Von Bergen et al. |
| 5,368,648 A | 11/1994 | Sekizuka |
| 5,425,543 A * | 6/1995 | Buckshaw et al. ............ 277/350 |
| 5,482,554 A * | 1/1996 | Perings et al. ................ 118/307 |
| 5,562,406 A | 10/1996 | Ooka et al. |
| 6,161,834 A * | 12/2000 | Pollack et al. ................. 277/300 |
| 6,481,720 B1 | 11/2002 | Yoshida et al. |
| 6,514,108 B2 | 2/2003 | von Bergen |
| 6,688,604 B2 | 2/2004 | Hashimoto |
| 7,648,177 B2 | 1/2010 | Tombler, Jr. et al. |
| 2001/0045705 A1 * | 11/2001 | Hashimoto ................... 277/558 |

FOREIGN PATENT DOCUMENTS

| | | |
|---|---|---|
| DE | 9014461 U1 | 3/1993 |
| JP | 10007092 A | 1/1998 |
| WO | 2007/124830 A1 | 8/2007 |
| WO | 2007/119112 A2 | 10/2007 |

* cited by examiner

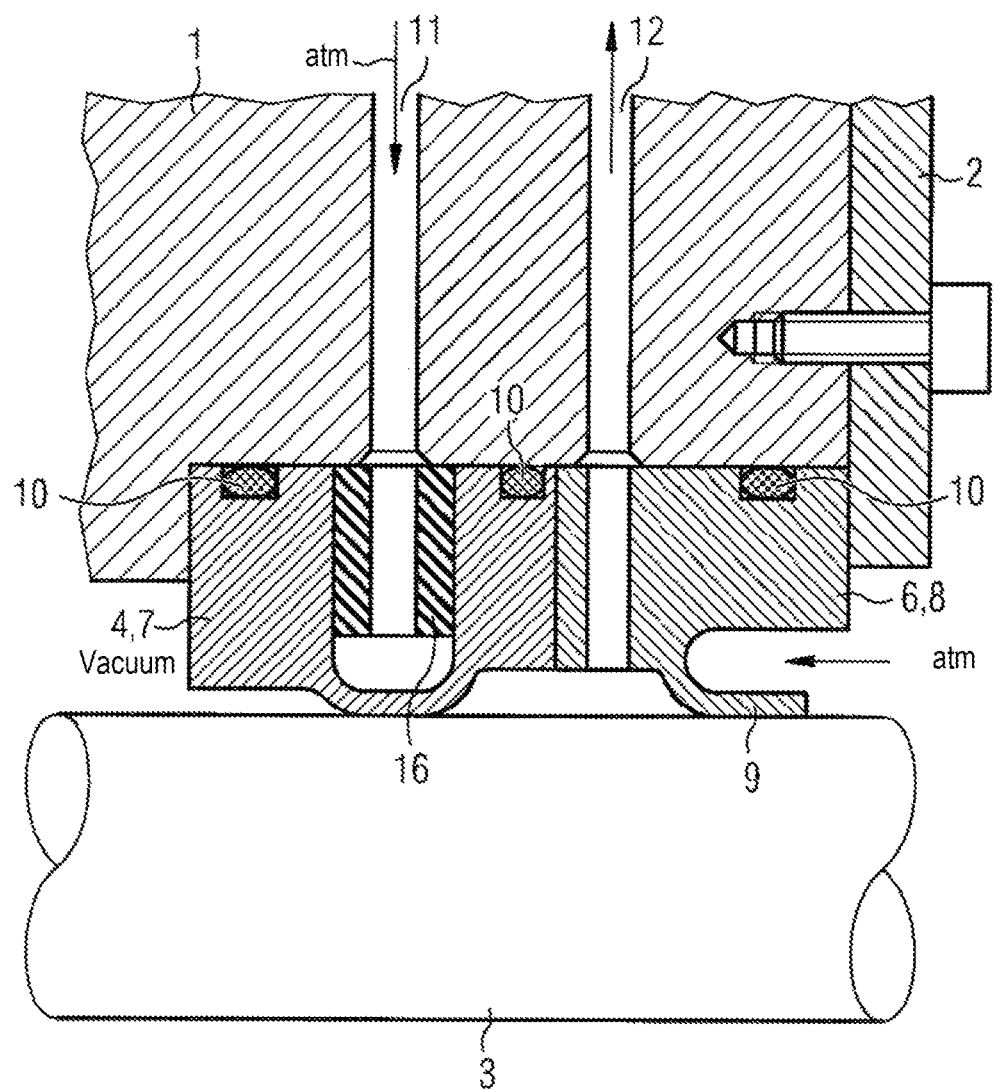

SEALING DEVICE FOR ROTARY FEEDTHROUGH

CROSS REFERENCE TO RELATED APPLICATIONS

This application is a continuation of application Ser. No. 12/643,457, filed Dec. 21, 2009, and claims priority of German Application No. 10 2008 064 181.2, filed Dec. 22, 2008 and German Application No. 10 2009 014 214.2, filed Mar. 25, 2009, the entire disclosure of all of these applications being hereby incorporated herein by reference.

BACKGROUND ART

The invention relates to a sealing device for a rotary feedthrough as is used, for example, in vacuum-processing facilities for coating substrates.

Rotary feedthroughs are needed in order to feed rotating parts (such as, for example, shafts) through housing walls and the like when the driving machine element, e. g. a drive device, is disposed on one side of the housing wall and the machine element to be driven, e. g. a rotating target, is disposed on the other side of the housing wall.

If a pressure differential must be maintained between the two sides of the housing wall (for example, atmospheric pressure on one side, high vacuum on the other side) and/or the atmospheres on the two sides of the housing walls have different compositions (for example, air on one side, inert gas on the other side), then it is necessary to configure the rotary feedthrough so that one prevents an undesired equalization of pressure or an exchange of gas between the two sides of the housing wall due to leakage in the rotary feedthrough.

Rotary feedthroughs for vacuum facilities can, for example, comprise two seals acting in tandem, where one seal is disposed so that it seals towards the atmosphere and the other seal is disposed so that it seals towards the vacuum or the process atmosphere. Between these two seals a complete separation of the media can be achieved, for example, with a sealing medium, that is, a sealing gas or a sealing liquid. Alternatively, separation of an atmosphere and a processing space can be achieved with an intermediate vacuum generated between both seals.

It is known that at higher rate of flow of alternating current through the shaft all the electrically conductive components which encircle the shaft in the manner of a ring can heat up to the point of destruction due to self-induction. This has as a consequence the fact that, in the selection of seals, springs, or supporting rings which encircle the shaft, attention must be paid to the fact that they have to be of non-conductive material or interrupted in their circumference.

It is also known that the sealing materials to be used must have good sliding properties in dry operation. This requirement can, for example, be met with the material PTFE with portions of graphite, molybdenum disulphide, or bronzes. The shaft surface can, for example, be coated with chromium oxide, which, in given cases, can be sealed with phenolic resin, thus attaining a very high strength of sealing.

However, several vacuum processes using large amounts of oxygen require a seal free of sealing media and cannot consist of oxidizing materials. For these instances of use, the sealing material PTFE with portions of polyoxybenzoyl ester combined with a countersurface of chromium oxide sealed with phenolic resin has proven itself effective. In that case the seal runs on the chromium oxide layer without lubrication.

In order to achieve a sufficient sealing effect, sealing elements of the sealing device can be provided, for example, with a sealing lip. Such sealing lips can, for example, be generated by using as a sealing element a circular ring disc whose inner diameter is less than the outer diameter of the rotating machine element which projects through the rotary feedthrough. Along with this there is a sealing gap between the sealing lip and the rotating machine element, said sealing gap being under intrinsic tension.

The atmospheric pressure which is present and the intermediate vacuum which is present generate in addition a pressure load on the sealing lip. Under the different pressure loads of the two sealing lips, different wear of the same arises towards the sliding surface. However, wear is of decisive importance for the service lifetime of the sealing device.

In the selection of the sealing materials of the sealing lips one must pay attention to the properties of good restoration properties, low wear, and good sliding characteristics. Problematic in the selection of the sealing materials is the fact that all the properties have mutual interactions.

The envisioned sealing combinations have the disadvantage that the sealing lip disposed nearer to the vacuum, due to the lower forces of compression, produces a lower sealing action and the sealing lip disposed nearer to the atmosphere experiences higher wear.

BRIEF SUMMARY OF INVENTION

One object is thus to fashion a sealing combination which simultaneously has good sliding characteristics and low wear and achieves a long service lifetime of the rotary feedthrough. The wear of both seals should be matched and the sealing action of the sealing combination should be increased.

For this purpose it is first of all proposed that for the seals, or the sealing elements comprised therein, materials be selected which have good sliding characteristics and low wear. Moreover, it is proposed to actively affect the relationship of the forces of compression which are exerted on the rotating machine element by the sealing elements in that it is provided that an additional force is applied at least to one sealing element. The additional force can be constant, for example, by a spring element being used which encircles the sealing element and is manufactured of a non-conductive material with elastic properties, for example, a polymer. This can, for example, be an O-ring or a special ring with a rectangular cross section, where the diameter is chosen so that the ring in the installed state is preloaded and in this way a constant additional force acting in the radial direction on the sealing element is generated (FIG. 1, 2, 3). By an appropriate design the magnitude of the additional force thus generated can be set.

The spring element can also consist of a metallic annular spring which is interrupted in a contact-free manner at at least one point.

Figure 4:
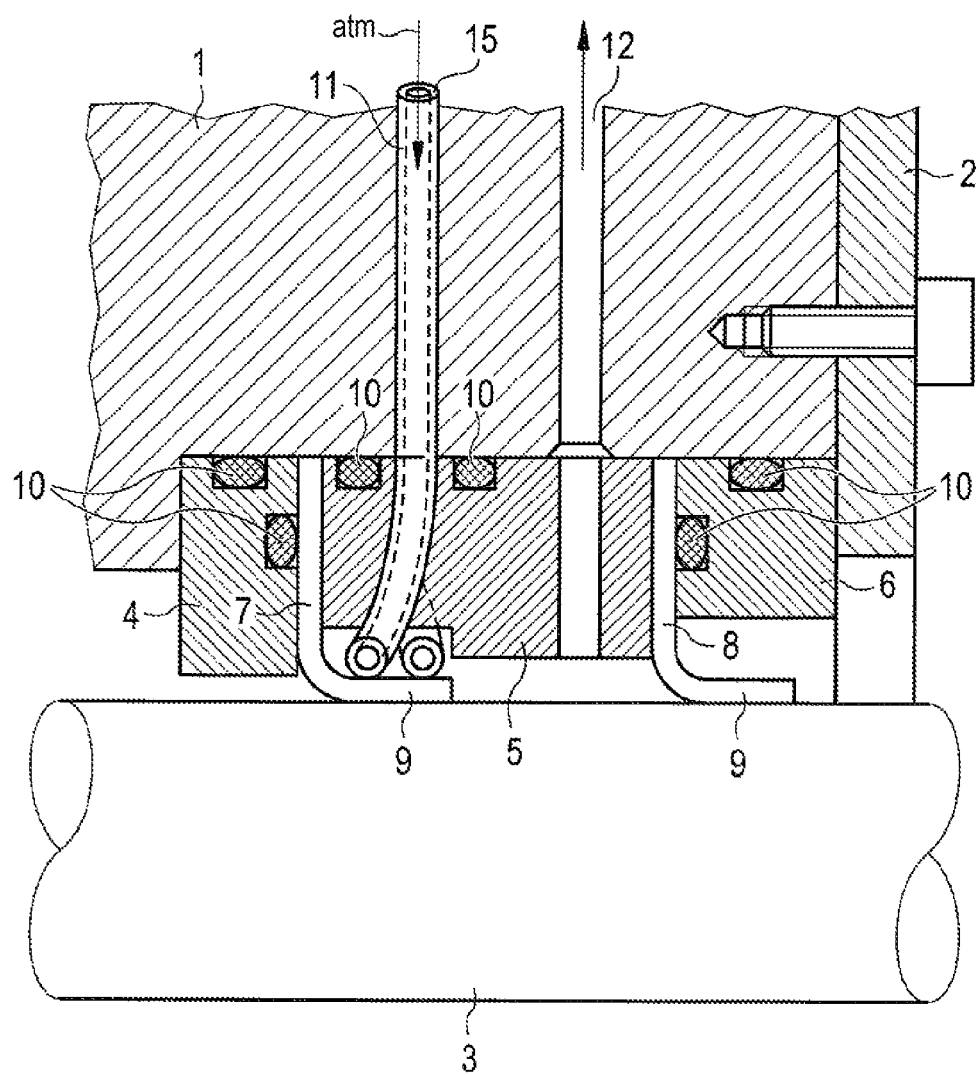
Figure 5:
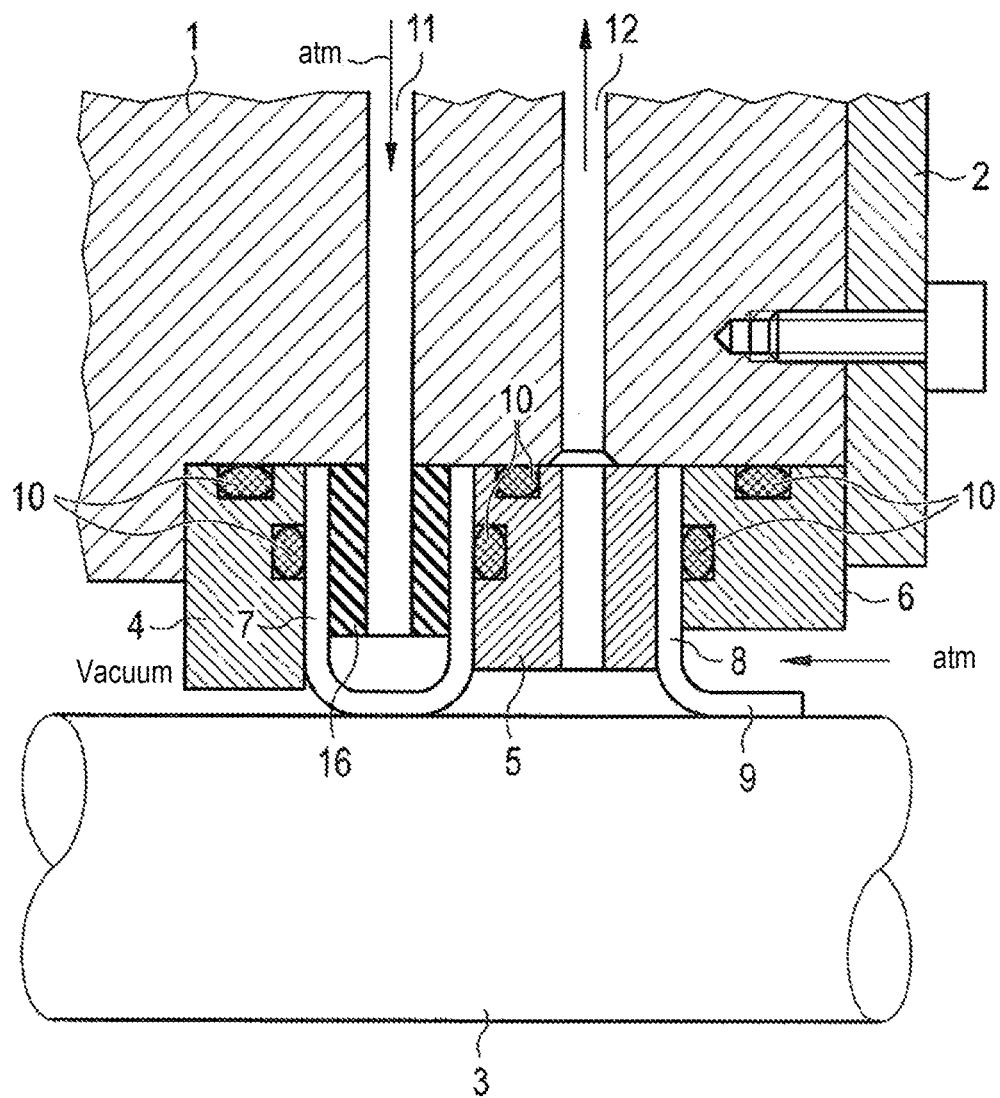

A variable, and thus also dynamically adjustable, additional force can be generated if a cavity encircling the sealing element is provided, said cavity being pressurized with a selectable internal pressure. This can be formed by the sealing element itself, for example, by the sealing element being a tube which is adjacent to the rotating machine element. The sealing element can also be a tube which is provided in addition and is adjacent to the sealing element (FIG. 4). Finally, it can be provided that the sealing element participates in the formation of the spring element in working together with other components, e. g. an additional ring which is also a part of the sealing device, so that the sealing element acts as a membrane which generates an additional radial force on the rotating machine element, said radial force being a function of the internal pressure of the cavity formed (FIG. 5).

In the embodiment examples presented the necessary preloading of the sealing lips is achieved via the atmospheric pressure and in the area of the intermediate vacuum by means of a spring element. The spring element is designed so that in total the generated force of compression on one sealing element is the same as the force of compression on the other sealing element, that force of compression being caused by the atmospheric pressure. Since the same forces act on both sealing elements, a maximum sealing with equal wear is achieved.

BRIEF DESCRIPTION OF THE DRAWING FIGURES

Figure 2:
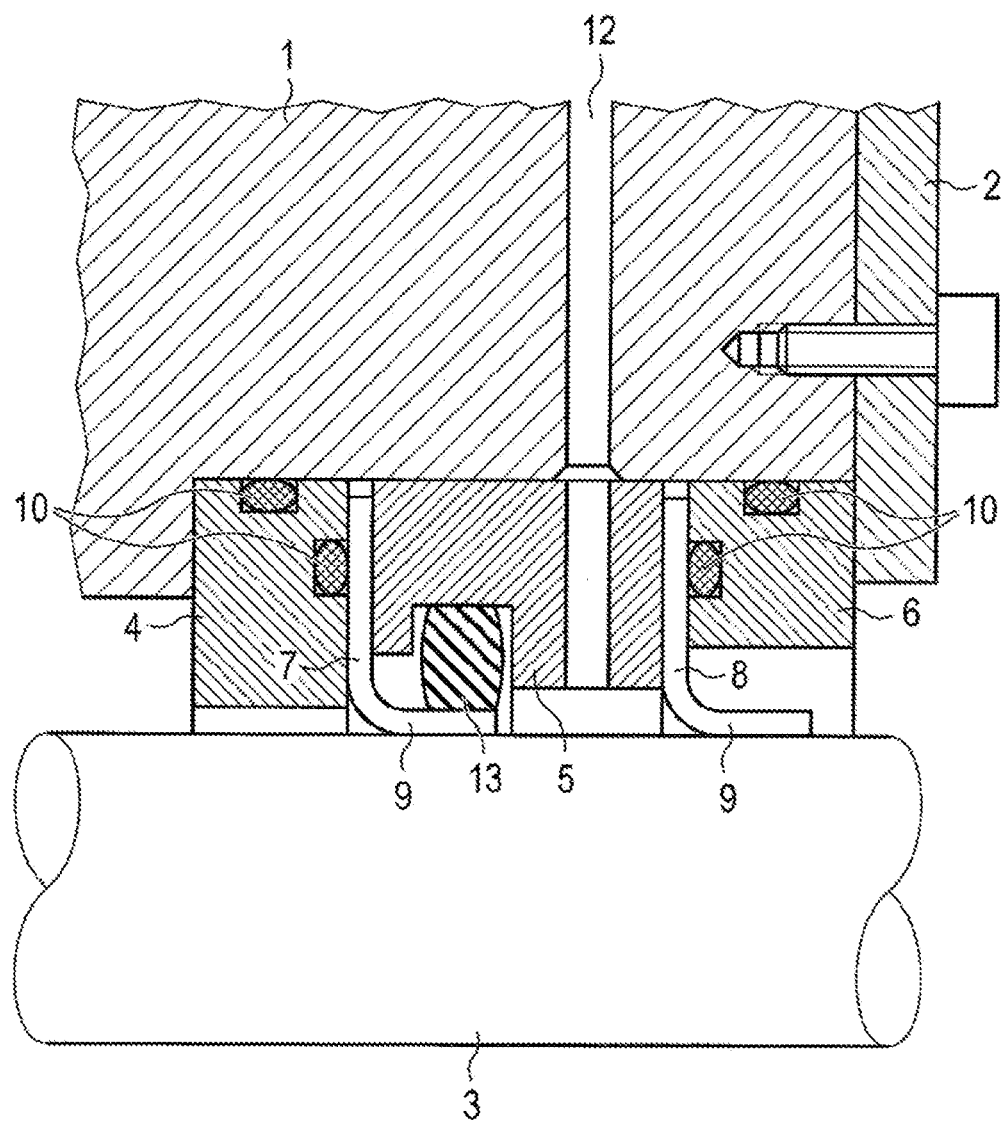
Figure 3:
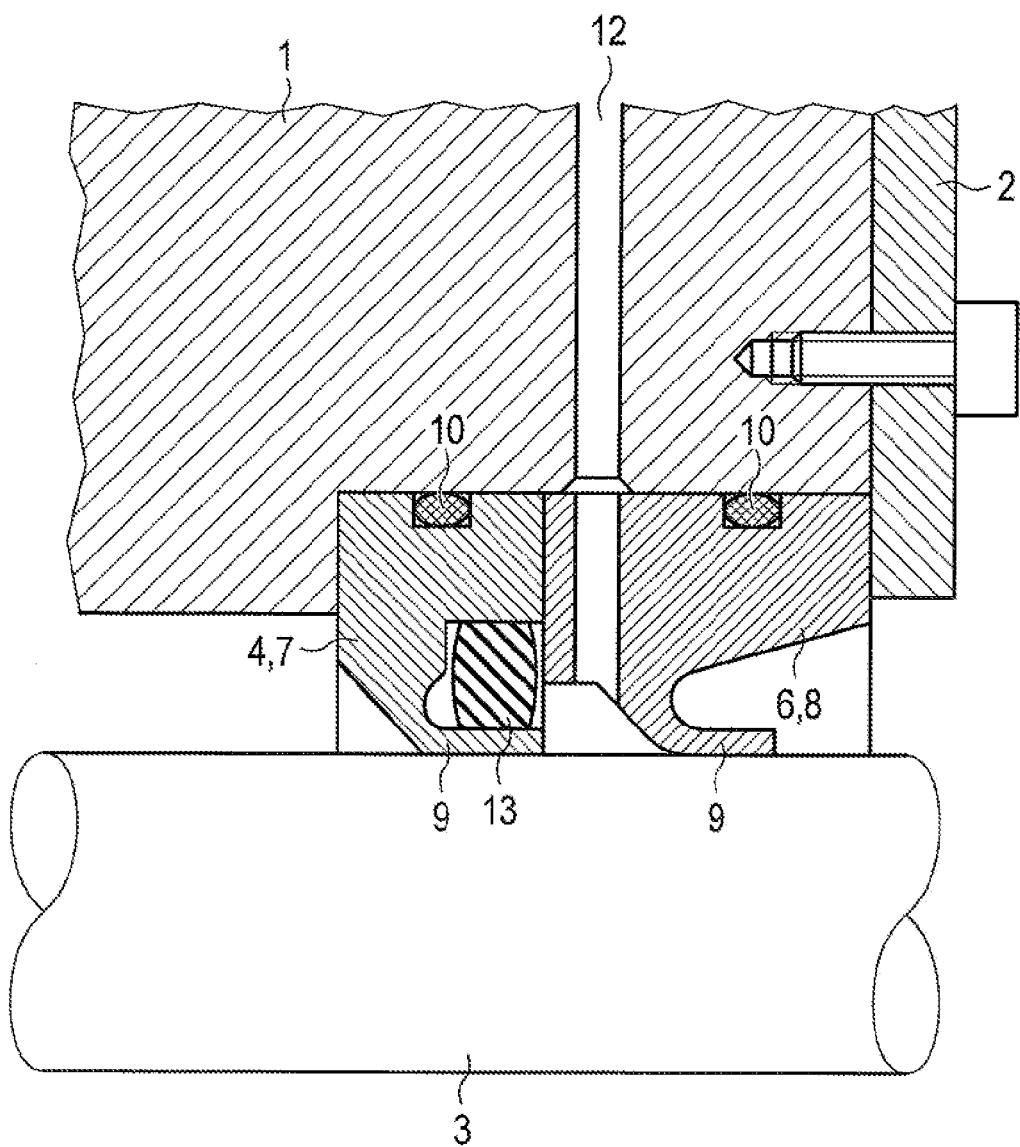

In the following the invention will be explained in more detail with the aid of embodiment examples and corresponding drawings. Therein FIG. 1 shows a first embodiment example in which the additional force of a sealing element is generated by a spring element and the atmospheric pressure acting thereon, FIG. 2 shows a second embodiment example in which the additional force of a sealing element is generated by a mechanically preloaded spring element, FIG. 3 shows a third embodiment example in which the sealing element is embodied as one piece, FIG. 4 shows a fourth embodiment example in which the spring element is a tube provided in addition and adjacent to the sealing element, FIG. 5 shows a fifth embodiment example in which the sealing element forms a cavity whose internal pressure communicating with the atmosphere generates the additional force, FIG. 6 shows a sixth embodiment example in which the sealing element forms a cavity whose internal pressure communicating with the atmosphere generates the additional force.

DETAILED DESCRIPTION

The embodiment examples of FIGS. 1 to 4 each show a sealing device comprising two sealing elements 7 and 8 disposed in tandem in the axial direction with sealing lips 9 turned up and an intermediate suction element disposed between the two sealing element 7 and 8 for generating a fore vacuum and intermediate vacuum. Through the additionally provided spring element 13 the compressive force of the inner sealing element 7 disposed nearer to the vacuum acts on the shaft 3.

In FIG. 1 the sealing device comprises several components disposed in tandem in a bearing seat 1 and held in position with a flange 2 with concentric openings through which a shaft 3 can be fed. These components comprise an inner limiting ring 4, a central limiting ring 5, and an outer limiting ring 6, where the inner limiting ring 4 is disposed on the side of the vacuum and the outer limiting ring 6 is disposed on the side of the atmosphere as well as an inner sealing element 7 disposed between the inner limiting ring 4 and the central limiting ring 5 and an outer sealing element 8 disposed between the central limiting ring 5 and the outer limiting ring 6.

The inner sealing element 7 and the outer sealing element 8 are each embodied as flat circular ring disc whose inner diameter is less than the outer diameter of the shaft 3 so that the inner edge of the circular ring disc is turned up and thus forms a sealing lip 9 abutting the shaft 3.

The limiting rings 4, 5, and 6 comprise, at suitable points, grooves into which O-rings 10 are laid which serve for sealing the limiting rings 4, 5, and 6 against one another or against the sealing elements 7 and 8 as well as against the bearing seat 1.

The central limiting ring 5 comprises two holes which on one side are empty between the inner sealing element 7 and the outer sealing element 8 and on the other side are connected to channels which are provided in the bearing seat 1. These are a gas intake duct 11 and a gas suction duct 12. The suction duct 12 serves to generate a fore vacuum or intermediate vacuum between the inner sealing element 7 and the outer sealing element 8. The gas intake duct 11 on the contrary communicates with the atmosphere so that in the area of its port between the inner sealing element 7 and the outer sealing element 8 atmospheric pressure prevails.

Between the port of the gas intake duct 11 and the turned-up sealing lip 9 of the inner sealing element 7 an annular spring element 13 and a membrane ring 14 are disposed. The membrane ring has the object of sealing the gas intake duct 11 with respect to the sealing lip 9, the sealing lip 9 of the inner sealing element 7 lying in the area of the fore vacuum generated by the gas suction duct, and simultaneously transmitting the atmospheric pressure to the spring element 13.

In this way the atmospheric pressure is transmitted through the gas intake duct over the membrane ring 14 and the spring element 13 to the sealing lip 9 of the inner sealing element 7 although at the sealing lip 9 of the inner sealing element 7 the pressure of the fore vacuum is present. Thus the pressure on the sealing lip 9 of the inner sealing element 7 is just as great as on the sealing lip 9 of the outer sealing element 8 which is directly exposed to the atmospheric pressure.

The embodiment example represented in FIG. 2 is distinguished from the embodiment example above by the fact that no gas intake duct 11 is present. Instead of this, the spring element 13 is disposed between the central limiting ring 5 and the sealing lip 9 of the inner sealing element 7 and in fact so that the spring element 13 is preloaded. This can be achieved by a suitable choice of the inner diameter of the central limiting ring 5, of the outer diameter of the sealing lip 9 of the inner sealing element 7, and the thickness of the spring element 13. In so doing, the preloading can be set so that the preloading of the spring element 13 generates an additional force on the sealing lip 9 of the inner sealing element 7, said additional force corresponding to the radial force generated by the atmospheric pressure which is acting on the sealing lip 9 of the outer sealing element 8.

In the embodiment example according to FIG. 3 the additional force on the sealing lip 9 of the inner sealing element 7 is generated in a manner analogous to the embodiment example according to FIG. 2, namely by mechanical preloading between the sealing lip 9 and a limiting ring. In this case however it is the inner limiting ring 4. A central limiting ring is not provided. In this development the inner limiting ring 4 is simultaneously the inner sealing element 7, that is, the sealing element 7 is not embodied as a separate, flat circular ring disc but rather is integrated into the inner limiting ring 4. In the same manner the outer sealing element 8 with the sealing lip 9 is an integral component of the outer limiting ring 6.

In FIG. 4 a further embodiment example is represented in which a tube 15 is inserted into the gas intake duct 11, said tube being adjacent to the sealing lip 9 of the inner sealing element 7 in the interior of the central limiting ring 5. Due to the difference in pressure between the atmospheric pressure within the tube 15 and the fore vacuum outside of the tube 15 the tube 15 inflates and thus generates an additional radial force on the sealing lip 9 of the inner sealing element 7.

In the embodiment example according to FIG. 5 an auxiliary ring 16 is disposed between the inner limiting ring 4 and the central limiting ring 5, said auxiliary ring comprising the hole connected to the gas intake duct 11. This hole empties into the interior of an inner sealing element 7 which is U-shaped in longitudinal section so that the atmospheric pressure acts on the lower area of the U-shaped cross section and thus there is generated an additional radial force on this lower area generating the sealing action with respect to the shaft 3.

In the embodiment example according to FIG. 5 the inner sealing element 7 disposed nearer to the vacuum, together with the adjacent auxiliary ring 16, forms a spring element with a cavity, where the adjacent auxiliary ring 16 comprises a hole through which the cavity communicates with the gas intake duct 11 and in this way with the atmosphere. Between the two sealing elements 7 and 8 a gas suction duct 12 is in turn disposed for generating a fore vacuum or an intermediate vacuum.

A similar development of a sealing device is represented in FIG. 6. Therein the inner limiting ring 4 itself forms the inner sealing element 7. A central limiting ring 5 is not needed. The auxiliary ring 16 is embedded in the inner limiting ring 4, that is, the auxiliary ring 16 is encircled by the inner limiting ring 4. The inner sealing element 7 disposed nearer to the vacuum, together with the encircled auxiliary ring 16, forms a spring element with a cavity, where the encircled auxiliary ring 16 comprises a hole through which the cavity communicates with the gas intake duct 11 and in this way with the atmosphere. The atmospheric pressure acts on the lower area of the inner sealing element 7 and thus there is generated an additional radial force on this lower area, said radial force generating the sealing action with respect to the shaft 3. Between the two sealing elements 7 and 8 there is disposed in turn a gas suction duct 12 for generating a fore vacuum and an intermediate vacuum, said duct emptying in the embodiment example in the area of the outer sealing element 8 with the sealing lip 9.

The invention claimed is:

1. A vacuum substrate coating installation comprising a housing wall separating a vacuum in the installation from atmosphere outside of the installation, and a vacuum-tight rotary feedthrough disposed in and applied to the housing wall, the vacuum-tight rotary feedthrough comprising:

a sealing device and a rotating machine element disposed in and rotatable relative to the sealing device, the sealing device comprising at least two sealing elements disposed in tandem in an axial direction of the rotating machine element, each of the at least two sealing elements having an axially extending sealing lip forming an active vacuum-tight sealing connection with the rotating machine element, the axially extending sealing lip of an outer sealing element being directly exposed to the atmosphere, the axially extending sealing lip of an inner sealing element extending between the vacuum and an intermediate vacuum generated between the inner sealing element and the outer sealing element and the rotating machine element by a gas suction duct, and a spring element applying to the inner sealing element an additional force acting in a radial direction so that total force of compression acting on the inner sealing element is the same as a force of compression caused by atmospheric pressure acting on the outer sealing element, wherein the inner sealing element acts as a membrane in cooperation with a cavity encircling the axially extending sealing lip of the inner sealing element, the cavity being directly continuously connected to the atmosphere to produce the additional radial force.

2. The vacuum substrate coating installation of claim 1, wherein the inner sealing element has a U-shaped configuration in longitudinal section, and the outer sealing elements has an L-shaped configuration in longitudinal section.

\* \* \* \* \*